United States Patent [19]

McCorkle et al.

[11] Patent Number: 4,877,271
[45] Date of Patent: Oct. 31, 1989

[54] HYDRAULIC CONNECTOR

[75] Inventors: Daniel J. McCorkle, Irvine; Tai H. Do, Fountain Valley, both of Calif.

[73] Assignee: Rexnord Inc., Torrance, Calif.

[21] Appl. No.: 32,700

[22] Filed: Apr. 1, 1987

[51] Int. Cl.[4] ............................................. F16L 35/00
[52] U.S. Cl. ........................................ 285/39; 285/92; 285/110; 285/220; 285/382.7; 285/917
[58] Field of Search ................ 285/92, 39, 382.7, 911, 285/110, 220; 411/109, 178, 968, 87

[56] References Cited

U.S. PATENT DOCUMENTS

| | | | |
|---|---|---|---|
| 1,195,165 | 8/1916 | Baker | 411/87 |
| 2,208,353 | 7/1940 | Woolley et al. | |
| 2,460,032 | 1/1949 | Risley | |
| 2,497,441 | 2/1950 | Detweiler | |
| 2,971,781 | 2/1961 | Torres | |
| 3,142,498 | 7/1964 | Press | 285/917 |
| 3,223,438 | 12/1965 | De Cenzo | |
| 3,259,162 | 7/1966 | Rosan | 411/109 |
| 3,395,934 | 8/1968 | Rosan et al. | 285/92 X |
| 3,404,415 | 10/1968 | Rosan et al. | |
| 3,495,853 | 2/1970 | Furrer | |
| 3,695,644 | 10/1972 | Goldberg | |
| 3,702,707 | 11/1972 | Rosan | |
| 3,851,901 | 12/1974 | Sills | |
| 3,993,331 | 11/1976 | Schwarz | |
| 4,230,349 | 10/1980 | Normork | 285/382.7 X |
| 4,261,599 | 4/1981 | Streed | 285/92 X |
| 4,343,496 | 8/1982 | Petranto | |
| 4,555,228 | 5/1987 | Yamabe et al. | |
| 4,568,228 | 2/1986 | Rosan, Jr. | |
| 4,697,828 | 10/1987 | Chou | 285/18 |
| 4,722,560 | 2/1988 | Guest | |

FOREIGN PATENT DOCUMENTS

| | | | |
|---|---|---|---|
| 520755 | 3/1931 | Fed. Rep. of Germany | 285/917 |
| 941521 | 4/1956 | Fed. Rep. of Germany | 285/92 |
| 2213901 | 1/1974 | Fed. Rep. of Germany | |
| 3130331 | 5/1982 | Fed. Rep. of Germany | |
| 2172310 | 9/1973 | France | |

OTHER PUBLICATIONS

Rosan Catalog, p. 1, 1985.
"Engineering Application Manual AM-19 Inverted MS Boss Seal Fitting Design", *Weatherhead*.

*Primary Examiner*—Dave W. Arola
*Attorney, Agent, or Firm*—Pretty, Schroeder, Brueggemann & Clark

[57] ABSTRACT

A fluid connection is formed between a tube for carrying fluid and a parent material having a surface wherein the fluid passes between the tube and the parent material. The connection has a first wall in the parent material defining a flow passage having a first diameter in the parent material for the fluid. A second wall is formed between the first wall and the surface of the parent material. Threads are formed in the parent material between the second wall and the surface of the parent material for engaging an insert. A tube having an end portion placed adjacent the second wall is used in the joint wherein the tube is sealed in the parent material between the first wall and the threads in the parent material. An insert engages the threads for maintaining the tube in a sealed condition.

11 Claims, 2 Drawing Sheets

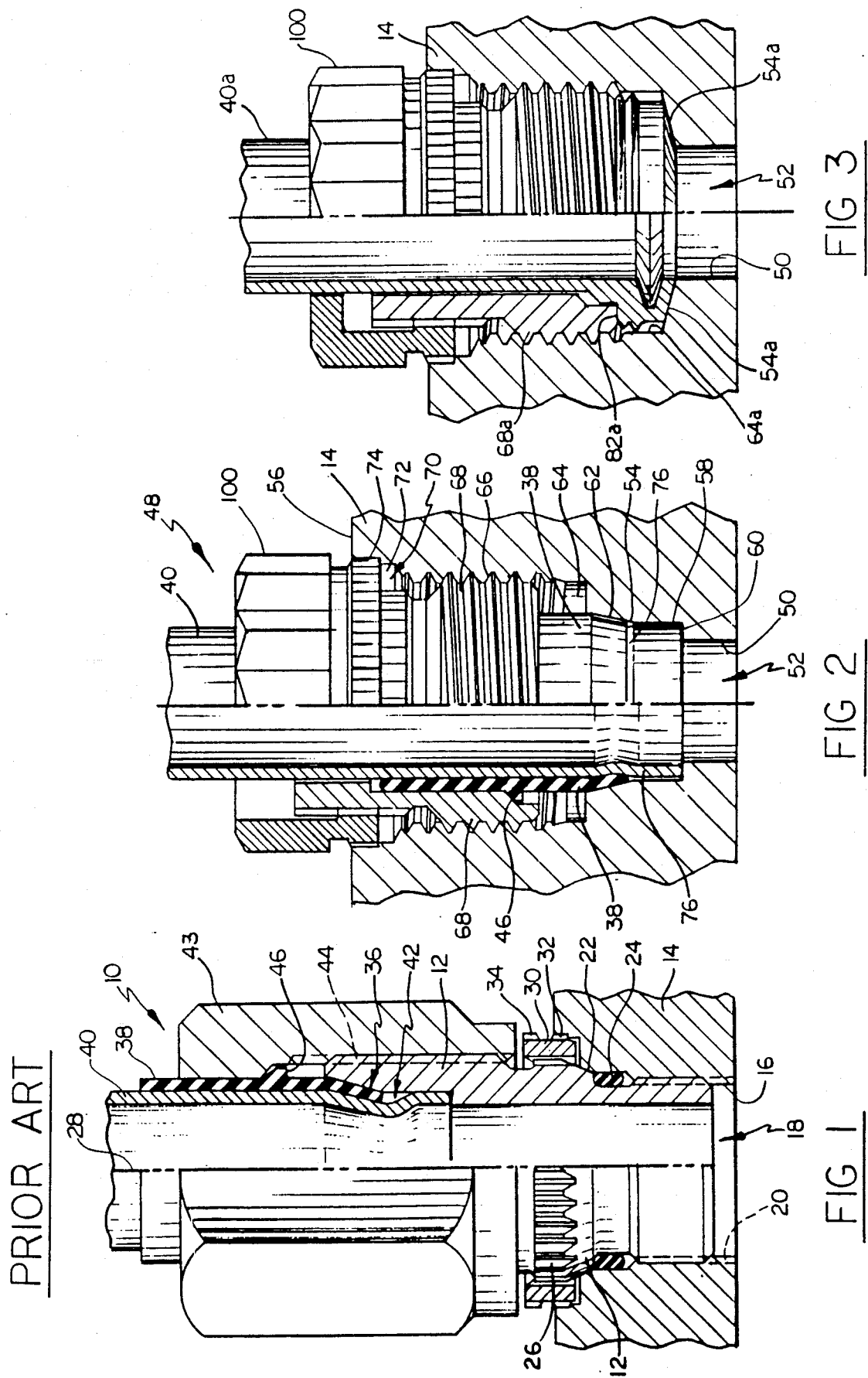

HYDRAULIC CONNECTOR

BACKGROUND

1. Field of the Invention

The present invention relates to hydraulic, pneumatic and other substance connectors, and more specifically to fluid connectors wherein the primary seal between a tube and a parent material to which it is connected, is interior to the outer surface of the parent material.

2. Related Art

Fittings for providing a leak-proof attachment between a hydraulic or other fluid conducting tube and associated hardware such as actuators, manifolds, etc., are well known. Connectors and adapters may also serve the same function. One type of well known fitting is that shown in the Rosan, Sr. Patent, U.S. Pat. No. 3,702,707. A modified form of the Rosan fitting is shown in FIG. 1 herein and labeled as prior art.

The fitting combination 10 shown in FIG. 1 includes a fitting 12 threaded into a parent or base material 14. The parent material may be steel, aluminum or any other material forming the particular housing or hardware to which a fluid connection is to be made. For example, the parent material may be the wall of an actuator, manifold, etc. A cavity 16 defines a passageway 18 through which the fluid is passed. The fluid may be hydraulic or pneumatic and may be under pressure. Pressures may be between 3,000 and 8,000 psi for example. The cavity 16 may be threaded with internal threads shown schematically at 20. The passageway may be threaded partially or entirely along its length. The fitting 12 includes mating threads for engaging the threads in the passageway.

The fitting forms a first primary seal 22 with the parent material 14. The first primary seal 22 is formed between a frusto-conical section in the parent material and a converging surface on the fitting 12. An elastomeric O-ring 24 serves as a secondary seal. The fitting includes serrations 26 extending in a direction parallel to the central axis 28 of the fitting combination and is held in engagement with the parent material 14 by a lockring 30. The lockring has internal serrations that mate with the external serrations 26 on the fitting and engages the parent material with external serrations 32 on its lower part and mating serrations formed in the parent material in a pre-broached counterbore. The lockring 30 prevents rotation of the fitting relative to the parent material, thereby preventing the fitting from backing out of the parent material.

Upper serrations 34 formed in the upper portion of the lockring are used together with an appropriate tool to torque the fitting into the parent material.

A second primary seal 36 is formed between an upper frusto-conical section of the fitting 12 and a ferrule or sleeve 38. The sleeve surrounds a portion of the end of a tube 40. A crimp 42 in the lower portion of the tube is partially formed during setting of the sleeve and is fully set when the sleeve 38 is cammed inward by the first frusto-conical portion of the fitting. The contact between the fitting, the sleeve and the tube forms the second primary seal.

The second primary seal is formed by torquing a B-nut 43 so that the threads 44 advance the B-nut downward over the fitting 12. Engagement of an angled surface on the inside of the B-nut with a correspondingly sloped flanged portion 46 extending outwardly from the sleeve causes the sleeve and tube to also move downward and into contact with the frusto-conical portion of the fitting.

The prior fitting combination is a multiple-piece arrangement and requires a series of steps to form a connection. The fitting must be threaded into the parent material and the lockring set into the pre-broached parent material. Then, the tube, sleeve and B-nut are placed over the top of the fitting and tightened down. This provides a fitting with two primary seals, one between the fitting and the parent material and the other between the fitting and the sleeve. A secondary seal is provided with the O-ring. The fitting combination does not have a very low profile since the fitting extends substantially above the surface of the parent material and the B-nut is entirely exposed above the parent material. Furthermore, a lockwire is necessary to fix the B-nut relative to the fitting so that the B-nut does not back off the fitting The lockwire must be passed through holes formed in the B-nut and secured to a boss on the parent material.

It is common practice to routinely replace the O-rings 24. This may be done during an overhaul or cleaning of the hydraulic fittings. When this is done, the B-nut is loosened after removing the lockwire, and the tube and sleeve removed from the fitting. The fitting is then removed by lifting out the lockring with a lockring removal tool and unthreading the fitting All parts are then cleaned and the O-ring replaced. If the tube, sleeve and B-nut only are to be removed, the fitting remains in the parent material. This may occur when the entire component is removed entirely from all hydraulic lines and serviced During servicing, it is possible that the exposed fitting could be damaged. This could damage both the fitting and the parent material.

Similar characteristics are also present in other types of hydraulic fittings.

SUMMARY OF THE INVENTION

In one form of the invention, a fluid connection may be made between a fluid carrying tube and an internally threaded parent material. The tube with which the connection is to be made will have an external flanged portion extending circumferentially around an end portion of the tube. The connection is formed using a first member having generally annular body means having upper and lower portions for encircling at least part of the tube. The first member includes external threads on only the lower portion of the body and first means on the upper portion of the body for engaging a second member. A substantially uniform surface is formed on an interior portion of at least the upper portion of the body for encircling the tube. A second surface in the lower portion of the body is separate from the substantially uniform surface and faces at least partly in a direction away from the upper portion of the body means for contacting the external flanged portion on the tube. The connector further includes a second member engaging and axially moveable relative to the first member and comprises second means on an interior portion of the second member for engaging the engaging means on the upper portion of the body of the first member for substantially preventing relative rotational movement therebetween. Means are provided on an external surface of the second member for engaging a parent material when the first member is threaded into the parent material. Means are provided in the second member for engagement with a removal tool for moving the second member away from the first member.

In a further form of the invention, the first and second members described above provide a single primary seal formed between a hydraulic tube and sleeve combination and a parent material to which they are coupled. Specifically, a fluid connection is formed between the tube for carrying fluid and the parent material through which the fluid passes. A first wall in the parent material defines a flow passage having a first diameter. A second wall is formed between the first wall and the surface of the parent material. Engagement means are provided between the second wall and the surface of the parent material for engaging the first member in the form of an insert. A tube having an end is placed adjacent the second wall wherein the tube is sealed in the parent material between the first wall and the engagement means. Insert means engaging the engagement means is provided for maintaining the tube in a sealed condition. This arrangement can be used for, but is not limited to, flareless tubing or dynamic beam seal tubing. Only one primary seal is necessary between the tubing and the parent material. This fluid connection provides a low profile connection for fluid lines. The connection also has fewer parts and is lighter in weight than previous connections. The same pressure requirements can still be met with this connection as were met with previous connections or fittings. No O-ring is necessary for creating a secondary seal. Furthermore, when the connection is removed from the parent material, there is no element protruding from the surface of the parent material. The sealing surface is below the parent material surface, and therefore protected from damage while the connection is disassembled. Additionally, the threads for engaging the insert means are below the surface of the parent material.

In one form of the invention, the insert means is threaded into the parent material. The insert means may include hex points by which the insert is torqued using a standard wrench. The insert may then be fixed relative to the parent material using the standard lockwire. Alternatively, a second element in the form of a lockring may be used with the insert. The insert would include external serrations for engaging internal serrations on the lockring. The lockring would also include external serrations for engaging the parent material, which will have been previously broached to form mating serrations. The lockring would further include means by which a wrench can be used to torque the lockring and thereby thread the insert into the parent material.

In a preferred embodiment, the dimensions of the internal lockring serrations and the dimensions of the serrations on the insert are such that an interference fit is formed therebetween. As a result, the lockring is captivated with respect to the insert. Only a force sufficient to overcome the frictional engagement between the lockring and the insert will move the lockring up or down relative to the insert. Since the lockring engages the parent material through mating serrations, no lockwire is necessary. The top of the lockring may include an inwardly extending lip or flange surrounding the tube. This provides protection from foreign material getting into the insert.

In a further embodiment of the invention, the insert may be used in conjunction with a standard dynamic beam seal tube, in which case the sleeve is omitted. The insert would have a relatively flat bottom surface for contacting the dynamic beam seal tube end. In all other respects, however, the fluid connection is substantially the same as the fluid connection using a sleeve and flareless tubing.

BRIEF DESCRIPTION OF THE DRAWINGS

In the drawings:

FIG. 1 shows a schematic elevation and partial longitudinal cross sectional view of a prior fluid fitting combination for connecting a fluid tube to a housing;

FIG. 2 is a schematic elevation and partial longitudinal sectional view of a fluid connector according to an embodiment of the present invention after forming a connection between a flareless tube and a housing material;

FIG. 3 is a schematic elevation and partial longitudinal sectional view of a fluid connector according to an embodiment of the invention after forming a connection between a dynamic beam tube and a housing material;

DETAILED DESCRIPTION OF THE PREFERRED EMBODIMENT

Figure 4:
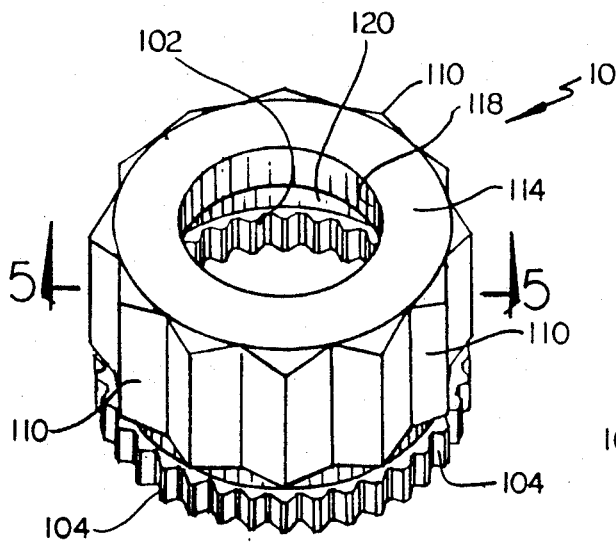
FIG. 4 is a perspective view of a lockring for use in a connector for making a connection as shown in FIGS. 2 and 3.

A fluid connection 48, as shown in FIG. 2, connects the tube 40 to the parent material 14. (Those elements substantially the same in structure and function as the elements in FIG. 1 are identically numbered). The tube is for carrying hydraulic or pneumatic fluid and may be rated for withstanding pressures of up to an 8,000 psi operating system. The tube maintains a fluid connection between a remote device and a component such as an actuator or manifold of which the parent material is a part.

A first wall 50 in the parent material defines a flow passage 52 having a first diameter in the parent material for passing fluid between the tube 40 and the hydraulic or pneumatic component. (It will be assumed hereafter that the fluid connection is to be made for a hydraulic fluid line. However, it is to be understood that the connector may be used for pneumatic or other suitable connections.) The flow passage 52 is preferably circular in transverse cross-section.

A second wall 54 is formed in the parent material and extends between the first wall and a point below the surface 56 of the parent material. The second wall is the location of the primary and only seal, as described more fully below. The second wall includes a first counterbore 58 in which the end of the tube 40 is positioned. The frusto-conical section includes a transversely extending shoulder 60 against which the end of the tube abuts. The inside diameter of the counterbore is greater than the inside diameter of the passageway 52, for example by an amount approximately equal to twice the wall thickness of the tube 40.

A first frusto-conical section 62 diverges away from the first counterbore 58 and forms the remainder of the second wall 54. The frusto-conical section serves as the sealing surface against which the sleeve 38 contacts.

The second wall is preferably circular in transverse cross-section.

A second counterbore 64 extends outwardly toward the surface 56 from the second wall 54. The second counterbore includes engagement means in the form of internal threads 66 in a circumferential wall of the counterbore between the second wall and a point below the surface of the parent material. The threads engage an insert 68, to be described more fully below.

The threads extend upwardly to a third counterbore 70 having a cylindrical wall 72. The top portion of the cylindrical wall 72 is prebroached to form serrations 74 for engaging mating serrations on a lockring, to be described more fully below. The serrations are formed in the cylindrical wall so that the radially inward-most portions of the serrations are flush with the remainder of the cylindrical wall 72.

The tube has an end portion 76 to be ultimately positioned adjacent the second wall 54 such that the tube is sealed in the parent material between the first wall 50 and the threads 66. In the embodiment shown in FIG. 2, the seal is preferably formed at the frusto-conical section 62 in the second wall 54. The actual seal is formed between the wall of the frusto-conical section 62 and the sleeve 38. A seal is also provided between the sleeve and tubing as occurred with previous connections and fittings. The end portion 76 of the tube 40 and the sleeve 38 surrounding the end of the tube are substantially identical to those used with the prior connectors and fittings. Therefore, there is only one primary seal in the connection and it is formed below the surface 56 of the parent material and below the threads 66 engaging the insert means. The recessed seal makes it less subject to vibrational stresses and makes the seal surface less subject to damage when the connector is not in place. The recessed seal also allows a lower profile connection.

Insert means in the form of an insert 68 engages the threads 66 for maintaining the tube in a sealed condition. In the embodiment shown in FIG. 2, the insert 68 includes threads complementary to the threads 66 formed in the parent material. The insert maintains both the tube and the sleeve in their final, sealed condition in the parent material when the insert is tightened down to the required amount and locked in place.

Figure 6:
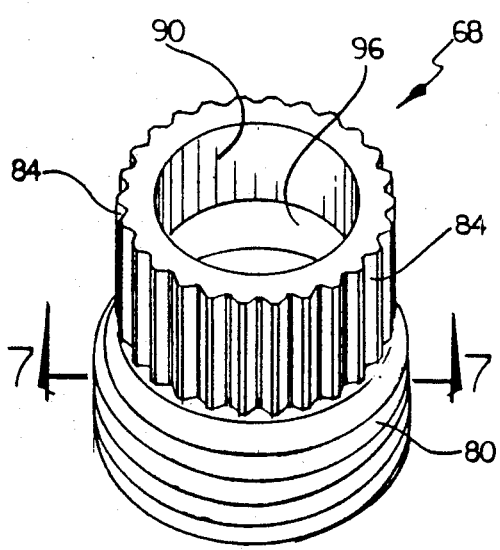
FIG. 6 is a perspective view of an insert for a connector for making a fluid connection between a fluid tube and housing materials such as is shown in FIGS. 2 and 3.
Figure 7:
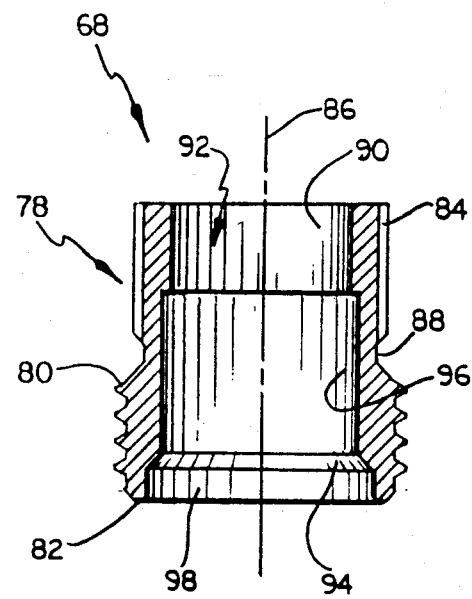
FIG. 7 is a longitudinal sectional view of the insert taken along lines 7—7 of FIG. 6.

Referring to FIGS. 6 and 7, the insert 68 has a generally annular body 78 with external threads 80 on a first portion of the body mating with the internal threads 66 in the parent material. The external threads preferably extend over approximately the bottom half of the annular body 78 from a bottom rim 82 upwardly. The insert further includes first means in the form of serrations 84 on a second portion of the body for engaging a second member, such as a lockring to be described more fully below. In the embodiment shown in FIGS. 6 and 7, the serrations preferably extend over the top half of the body, in a direction parallel to a central axis 86. An annular groove or undercut 88 extends circumferentially around the annular member at an approximate middle of the insert between the external threads and the serrations. The undercut allows expulsion of debris and burrs during formation of the threads and serrations.

The insert includes a first substantially uniform cylindrical surface 90 on an interior portion 92 of the insert and defines a bore for surrounding the tube 40 (FIG. 2). A second surface 94 is formed on the interior surface of the first portion of the insert. The second surface 94 is separate from the first cylindrical surface and faces at least partly in a direction away from the first surface. In the embodiment shown in FIG. 7, the second surface is a frusto-conical surface diverging outwardly and downwardly, as viewed in FIG. 7, from a first counterbore 96 in the insert to a second counterbore 98 in the insert The second surface engages and mates with the sloped surface on the external flanged portion 46 on the sleeve The angle of divergence of the frusto-conical section substantially conforms to the angle of the flanged portion 46 just as the angle on the interior surface of the B-nut 42 of prior devices conformed to the sloped surface on the flanged portion.

The first counterbore 96 in the insert extends from the first cylindrical surface 90 to the second surface 94. The first counterbore extends from an approximate mid-portion of the serrated part of the insert to an approximate mid-portion of the threaded part of the insert. The inside diameter of the first counterbore is dimensioned so as to clear the outside surface of the sleeve 38 The second counterbore 98 in the insert extending downwardly from the frusto-conical surface 94 to the bottom rim 82 is dimensioned so as to clear the outside edge of the flanged portion 46 on the sleeve.

Figure 5:
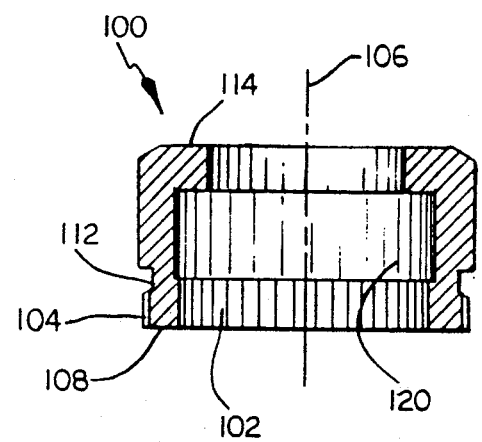
FIG. 5 is a longitudinal sectional view of the lockring taken along lines 5—5 of FIG. 4.

A second member in the form of a lockring 100, shown specifically in FIGS. 4 and 5, is axially moveable relative to the insert. The lockring includes second means in the form of serrations 102 on an interior portion of the lockring for engaging the serrations 84 on the insert. Interengagement of the serrations 84 and 102 prevents relative rotational movement between the lockring and the insert.

Means in the form of external serrations 104 is formed on an external surface of the lockring for engaging the parent material 14 when the insert is threaded into the parent material. The internal and external serrations are formed on a lower portion of the lockring and extend along a direction substantially parallel to a central axis 106, substantially coaxial with the central axis 86 of the insert. In the preferred embodiment, the internal serrations 102 on the lockring are dimensioned relative to the external serrations 84 on the insert such that there is frictional engagement or an interference fit therebetween, so that the lockring does not slide axially relative to the insert without application of an external force. This keeps the lockring positioned axially relative to the insert at its original position so that the insert can be torqued into the parent material by turning the lockring without having the lockring contact the surface 56 of the parent material prematurely. As shown in FIG. 2, the external serrations on the insert are formed such that the lockring can slide axially along the insert a substantial distance toward the threads 80 on the insert. A flat bottom rim 108 on the lockring extends substantially in a plane transverse to the central axis 106 between the internal serrations and the external serrations Both the internal and external serrations extend axially upward away from the bottom rim 108.

The lockring further includes third engagement means in the form of hex points 110 on the approximately upper two-thirds of the outer circumferential surface of the lockring to be engaged by an appropriately formed tool for rotating the lockring about the central axis 106. In the embodiment shown in FIG. 4, the lockring includes 12 hex points. Therefore, the lockring can be rotated using a standard wrench. In an alternate embodiment (not shown), two flats may be formed on the lockring by omitting two oppositely disposed hex points This forms a 10-point engagement means, wherein five of the points are separated from the other five points by the two flats This would allow use of other standard wrenches for turning the lockring.

A groove or undercut 112 is formed in the outer circumference of the lockring between the hex points 110 and the external serrations 104. The groove facilitates formation of the serrations and hex points and also provides means with which a lockring removal tool can engage to slide the lockring axially away from the threads 80 on the insert 68. Such a groove is also shown in the lockring 30 of the prior art device shown in FIG. 1.

The hex points extend upwardly to a substantially flat top surface 114 on the lockring. The top surface 114 extends substantially transverse to the central axis 106. The top surface forms part of an inwardly extending lip or flange 116 extending radially inwardly toward the central axis 106 from the wall of the lockring. The flange defines a substantially cylindrical opening 118 in the top of the lockring dimensioned to surround the tubing 40. The flange 116 and the internal serrations 102 define the top and bottom, respectively, of an internal cylindrical surface 120 of the lockring.

The lockring can be formed using powder metallurgy technology. This will allow relatively easy formation of the flange 116. The flange is useful for protecting the insert and the interfaces between the tube, insert and lockring from foreign matter and debris. In an alternate embodiment, the flange may be omitted, for example where the lockring is machined, so that the internal cylindrical surface 120 of the lockring extends completely to the top surface 114 of the lockring Without the flange, a sealant (not shown) may be placed between the lockring and the tube so as to prevent entry of foreign matter and debris once the connection has been made.

Referring now also to FIG. 2, it can be seen that the lockring 100 engages the insert through the internal serrations 102 on the lockring and the external serrations 84 on the insert. The lockring is then used to tighten down the insert to the position shown in FIG. 2. The frusto-conical portion 94 of the insert contacts the sloped surface on the flanged portion 46 of the sleeve, thereby bearing downward on the sleeve to maintain the lower end of the sleeve in the primary seal area. The insert 68 is threaded into the parent material to the required amount to adequately seal the tube 40 in the parent material. The lockring has been moved downwardly so that the external serrations 104 engage the internal serrations 74 formed in the parent material. In this configuration, the lockring prevents rotation of the insert and therefore prevents the tube and sleeve from backing out of the parent material. Therefore, the primary and only seal is maintained.

The process of forming the tubing connection will now be described. In the well known manner, the passageway 52 is formed in the parent material. A pilot tool is then used to form the second wall 54 and the second counterbore 64 in the parent material The third counterbore 70 is also formed at the same time. The pilot tool is removed and a threading tap is used to form the threads 66. The cylindrical wall 72 is then prebroached to form the serrations 74 therein. The openings in the parent material are then cleaned and prepared as necessary. The tube and sleeve are prepared in a manner substantially identical to previous methods. The insert and lockring are obtained as a unit with the lockring captivated on the insert. The interference fit between the lockring and the insert is preferably such that the lockring does not slide axially relative to the insert during shipment and assembly. The lockring is axially positioned on the insert such that application of the required torque to the lockring in order to properly seal the tube in the primary seal area will bring the bottom rim 108 of the lockring close to the upper surface 56 of the parent material. The insert and lockring combination are passed over the tube so that the frusto-conical surface 94 in the insert can engage the flanged portion 46 on the sleeve.

The tube assembly is now placed in the opening formed in the parent material as described above. The tube and sleeve combination is inserted into the opening and the insert threaded into the parent material. The insert is rotated using a wrench engaging the hex points on the lockring. Turning the wrench therefore turns the insert. As the insert and lockring advance, the insert bears against the flanged portion and forces the tube and sleeve into the area defined by the second surface 54. As the rotation of the lockring and insert is continued, the seal between the parent material at the second surface 54 and the sleeve is formed. When the required torque is applied to the lockring, the required seal is formed between the second surface 54 and the lower end of the sleeve. Additionally, the crimp in the tubing is completely formed. At the same time, the bottom rim of the lockring is close to the top surface of the parent material. The lockring is then rotated an appropriate amount until the external serrations on the lockring are aligned with the serrations 74 in the parent material. The lockring is then driven downward toward the insert using a lockring drive tool so that the serrations on the lockring engage the serrations in the parent material The lockring and insert are then fixed relative to the parent material so that the insert cannot back out of the parent material. Therefore, the sleeve is fixed relative to the second surface and the primary seal is maintained.

To break down the connection, a lockring removal tool engages the undercut 112 in the lockring to lift the lockring axially away from the insert and the parent material. When the external serrations 104 disengage from the serrations 74 in the parent material, a wrench can be used to engage the lockring and rotate the lockring and insert combination, backing the insert out of the parent material. The sleeve and tube can then be removed.

In the embodiment shown in FIG. 2, no fitting or B-nut is necessary to form the tube connection. Only one seal is required and O-rings are optional. Additionally, lockwires are not required. The fewer number of parts facilitates manufacture and assembly of the connector elements and shipment to the final assembly point. It also reduces inventory. This also produces a weight reduction of approximately 60% compared to prior fittings. Furthermore, the profile of the resulting connection above the surface of the parent material is less than in prior fittings. For example, the connector stand-off height is approximately one-third of that for the fitting shown in FIG. 1. When the connection is disassembled, the sealing surface (i.e. the second wall 54) is not exposed to the surrounding environment in the manner that the sealing surface of the second primary seal 36 is exposed when the B-nut and tube are removed. The present connection produces stronger connection and less susceptible to vibrational forces.

Torque will be used with the present insert as was used in setting the fitting in the prior art device. However, the thread dimensions and the axial location of the lockring on the insert are designed so that the required seal is automatically formed when the required torque has been achieved and so that the bottom rim of the lockring only approaches the top surface of the parent material but does not make contact.

In an alternate embodiment (not shown), the engagement between the lockring and the insert may be achieved through a combination of pins and slots. For example, the lockring may have a pair of diametrically opposed pins extending radially inwardly below the flange 116 on the lockring to engage diametrically opposed slots formed in the upper portion of the insert. Conversely, the pins may be formed in the insert to extend radially outwardly to engage corresponding slots formed in the lockring.

In a further alternate embodiment (not shown), the lockring may be omitted entirely and the external serrations on the insert modified to form means with which a wrench could engage the insert for rotating and seating the insert to form the primary seal. For example, the wrench engagement would include a 12-point hex. The hex point would extend a sufficient distance above the surface of the parent material when the insert is fully threaded so that the insert could still be removed. Furthermore, holes may be formed in the hex point for attachment of a lockwire as is done with present fittings. This would eliminate the lockring but would require a separate lockwire and boss for attachment of the lockwire to the parent material.

In a further embodiment, shown in FIG. 3, the primary seal is formed using a conventional dynamic beam tube seal. The lockring 100 is substantially identical in structure and function to that described with respect to FIGS. 2, 4 and 5, or it may be omitted entirely with appropriate modifications to the insert as described above with respect to FIG. 2 in the case where the lockring is omitted. The tube 40a is a dynamic beam seal tube. A sleeve 38 is not required. The base material 14 is formed using a modified porting tool to form the modified second surface 54a above the first wall 50 defining the passage way 52. The second wall 54a is a diverging frusto-conical portion diverging upward from the first wall 50 to the counterbore 64a. Otherwise, the formation of the opening in the parent material is substantially as described above with respect to FIG. 2.

The insert 68a is substantially similar to the insert 68 described above with respect to FIGS. 2, 6 and 7 except that the bottom rim 82a, which can be considered a second surface facing away from the insert, may include a more substantial flat surface for contacting the dynamic beam seal tube end. The bottom rim 82a contacts and bears against the seal tube end for creating and maintaining the primary seal at the second wall 54a.

The process of forming the connection shown in FIG. 3 is substantially the same as that described with respect to the embodiment shown in FIG. 2, except that the primary seal is formed directly between the second surface 54a and the tube end. A frusto-conical section is also included internally of the insert to clear the outside surface of the dynamic beam seal tube.

It should be noted that the above embodiments are preferred but others are foreseeable. The described embodiments of the invention are only considered to be preferred and illustrative of the inventive concepts; the scope of the invention is not to be restricted to such embodiments. Various and numerous other arrangements may be devised by one skilled in the art without departing from the spirit and scope of the invention.

We claim:

1. A connector for connecting a tube, for carrying fluid, to an internally threaded parent material using a tube having an external flanged portion around an end portion of the tube to be connected to the parent material, the connector comprising:
   a first member comprising:
      a generally annular body means having upper and lower portions for encircling at least part of a tube,
      external threads on only the lower portion of the body means, for threadedly engaging the parent material,
   first means on the upper portion of the body means for engaging a second member,
   a first substantially uniform surface on an interior portion of at least the upper portion of the body means for encircling the tube, and
   a second surface in the lower portion of the body means separate from the first substantially uniform surface facing at least partly in a direction away from the upper portion of the body means for contacting an external flanged portion on a tube; and
   a second member engaging and axially movable relative to the first member and comprising
   second means on an interior portion of the second member for engaging the first means on the upper portion of the body means of the first member for substantially preventing relative rotational movement therebetween,
   means on an external surface of the second member for axially engaging the parent material after the first member has been threaded at least partially into the parent material to substantially prevent rotation of the second member relative to the parent material, and
   means for engagement with a removal tool for moving the second member away from the first member.

2. The connector as claimed in claim 1 wherein the engaging means of the upper portion of the body means of the first member comprises serrations.

3. The connector as claimed in claim 1 wherein the second surface in the lower portion of the body means comprises a frusto-conical surface diverging away from the first substantially uniform surface.

4. The connector as claimed in claim 1 wherein the first member has a central axis and wherein the separate surface in the lower portion of the body means comprises a substantially flat surface extending substantially transverse to the central axis.

5. The connector as claimed in claim 1 wherein the connector has a central axis, wherein the first engaging means on the upper portion of the body means of the first member comprises first serrations extending in an axial direction and wherein the second engaging means on the interior portion of the second member comprises second serrations mating with the first serrations on the upper portion of the body of the first member.

6. The connector as claimed in claim 1 wherein the means on the second member for engaging the parent material comprises serrations.

7. The connector as claimed in claim 1, wherein an upper portion of the second member has means thereon adapted to be engaged by a tool for rotating the second member about the central axis.

8. The connector as claimed in claim 1 wherein the second member comprises a ring substantially encircling the first member.

9. A connector for connecting a tube, for carrying fluid, to a parent material using an externally flanged sleeve around an end of the tube to be connected to the parent material, the connector comprising:

an insert having an externally-threaded lower portion for threadably engaging the parent material and comprising serrations on an upper-most portion of the insert and means in an internal surface of the insert for engaging a flanged sleeve on a tube; and a ring encircling a portion of an external surface of the insert and axially slidable relative to the insert and comprising means on an external surface of the ring for non-rotatably engaging the parent material and means on an internal surface of the ring for engaging the serrations on the insert for preventing relative rotational movement between the ring and the insert.

10. The connector as claimed in claim 9 wherein the serration engaging means of the ring comprises serrations on an internal surface of the ring.

11. The connector as claimed in claim 10 wherein the ring further comprises an annular lip extending radially inward.

* * * * *